United States Patent [19]

Steffan et al.

[11] 4,217,209

[45] Aug. 12, 1980

[54] PROCESS FOR REMOVING HEAVY METAL SULPHIDES FROM AQUEOUS SYSTEMS

[75] Inventors: Guido Steffan, Odenthal; Ernst Borgmann, Alsdorf; Peter Büchel, Cologne; Wolfgang Harms, Leverkusen, all of Fed. Rep. of Germany

[73] Assignee: Bayer Aktiengesellschaft, Leverkusen, Fed. Rep. of Germany; DEX

[21] Appl. No.: 946,341

[22] Filed: Sep. 27, 1978

Related U.S. Application Data

[63] Continuation of Ser. No. 715,115, Aug. 17, 1976, abandoned.

[30] Foreign Application Priority Data

Aug. 20, 1975 [DE] Fed. Rep. of Germany ....... 2536969

[51] Int. Cl.$^2$ ............................ C02B 1/20; C02C 5/02
[52] U.S. Cl. ......................................... 210/53; 210/54
[58] Field of Search .................. 210/42 R, 49, 51–54, 210/75, 56

[56] References Cited

U.S. PATENT DOCUMENTS

| | | | |
|---|---|---|---|
| 3,023,162 | 2/1962 | Fordyce et al. | 210/52 |
| 3,055,827 | 9/1962 | Wiley | 210/53 |
| 3,377,274 | 4/1968 | Burke et al. | 210/53 |
| 3,418,237 | 12/1968 | Booth et al. | 210/54 |
| 3,617,568 | 11/1971 | Ries | 210/53 |
| 3,740,331 | 6/1973 | Anderson et al. | 210/53 |
| 3,835,084 | 9/1974 | Azorlosa et al. | 210/54 |
| 3,859,212 | 1/1975 | Smalley et al. | 210/54 |
| 4,088,573 | 5/1978 | Nakajima et al. | 210/53 |

*Primary Examiner*—Charles N. Hart
*Assistant Examiner*—Peter A. Hruskoci
*Attorney, Agent, or Firm*—Sprung, Felfe, Horn, Lynch & Kramer

[57] ABSTRACT

The invention relates to a method for removing heavy metal sulphides from dilute aqueous systems as they are present in numerous chemical processes. The method is characterized in that water-soluble polymers such as polyethyleneimines, homopolymers or copolymers of derivatives of acrylic acid or methacrylic acid or homopolymers or copolymers of styrenesulphonic acids are added to said systems and the systems are then filtered.

8 Claims, No Drawings

PROCESS FOR REMOVING HEAVY METAL SULPHIDES FROM AQUEOUS SYSTEMS

This is a continuation of application Ser. No. 715,115, filed Aug. 17, 1976 now abandoned.

Heavy metals are employed in numerous chemical processes as catalysts or reactants; after the reaction has taken place it is essential, for reasons of environmental protection, to remove them as completely as possible from products and effluents. Because most heavy metal sulphides are extremely sparingly soluble and have extremely low vapour pressures, precipitation of the sulphide from an acid solution offers a particularly suitable means of effecting the requisite removal of the heavy metals to the greatest possible extent. The precipitation of the sulphide can be carried out in a manner which is in itself known, for example with hydrogen sulphide, alkali metal sulphides and alkaline earth metal sulphides and also with various substances which eliminate hydrogen sulphide, such as thioacetamide and phosphorus pentasulphide, as described in German Offenlegungsschriften (German Published Specifications) Nos. 2,124,261 and 2,163,674. Because they are sparingly soluble, the heavy metal sulphides are usually obtained in an extremely finely divided form when they are precipitated, so that their removal from product solutions and effluents on an industrial scale, for example by filtration, presents considerable difficulties.

On a laboratory scale it is indeed possible to filter off heavy metal sulphides in the presence of adsorbents, such as active charcoal, aluminium oxide, silica gel, kieselguhr and other substances with a large surface, as is proposed in German Offenlegungsschriften (German Published Specifications) Nos. 2,247,329 or 1,593,761 and in Japanese Pat. No. 71,22,335, but this cannot be carried out economically industrially. If the filtration takes a relatively long time, the heavy metal sulphide either breaks through the filter element, so that the intended result, that is to say the virtually complete removal of heavy metals, is not achieved, or it gradually blocks the pores of the filter agent, so that the filter capacity is considerably reduced and the process thus becomes uneconomical; usually the two effects arise together, as has been found by experiments carried out by the applicant on a large number of adsorbents and filter aids.

This is readily explained by the observation that heavy metal sulphide which apparently is "adsorbed" on these adsorbents usually can be washed off from the latter relatively easily, for example by gentle rinsing with water, that is to say there is no relatively firm bond; the filter aid serves only as a fine filter.

Surprisingly, it has now been found that it is possible, with the aid of ionic polymers or combinations of ionic polymers to agglomerate heavy metal sulphides, such as mercury sulphide, copper sulphide and molybdenum sulphide, in acid aqueous suspensions to give coarse flocks which are so stable that it is possible, preferably after adding filter aids, to effect virtually complete removal of the sulphides by filtration, with good filter capacity. The amounts of ionic polymers necessary in order to achieve this effect are in the region of a few ppm, based on the amount of solution or effluent. Astonishingly, these combinations of polymers can also be employed successfully in strong acids, for example in up to 50% strength sulphuric acid, and at temperatures of, for example, up to 100° C.

Examples of filter aids which can be used for the coagulated heavy metal sulphides are active charcoals, cellulose materials, kieselguhrs, aluminium oxides, lignite dust, carbonised lignite and other permeable media.

The mixture of coagulated heavy metal sulphide and, where appropriate, filter aid can be isolated by means of a filter press covered with cloth. A filtration method which is technically particularly advantageous, also with regard to the recovery of heavy metals, is continuously to filter off the mixture of a little filter aid and the coagulated heavy metal sulphide by means of a rotary filter to which a precoat layer of pure filter aid has been applied. With this method, the layer of heavy metal sulphide and a little filter aid which is deposited on the filter is continuously removed with a doctor blade and a relatively concentrated heavy metal sulphide is thus recovered; moreover, due to the continual exposure of a surface which has good permeability, the filter capacity remains particularly high and this makes the economics of the filtration highly advantageous.

In the acid aqueous systems, the ionic polymers form flocks which bind the heavy metal sulphides.

It is possible to employ, for example, organic cationic and anionic polymers such as are described in the Encyclopedia of Polymer Science and Technology, Volume 7, page 64 et seq., (Interscience Publishers New York-London-Sydney), but combinations of cationic and anionic polymers are preferred.

The polymers used for coagulation of the heavy metal sulphide are prepared according to methods which are known from the literature and which are described, in particular, in the following publications:

Anionic polymers:

Bull. Soc. chim. France (5) 22, 485 (1955), Journ. Polym. Science 10, 379 (1953), Trans. AIME 217, 364 (1960), Tappi 44 (9), 156 A (1961), U.S. Pat. No. 3,714,136, DT-OS (German Published Specification) 2,135,742 and Journ. Polym. Science 54, 411 (1961).

Cationic polymers:

DT-OS (German Published Specification) No. 2,255,391, Amer. Chem. Soc. 74, 2027 (1952), U.S. Pat. Specification No. 2,471,959, U.S. Patent Specification No. 2,744,886, Ind. and Engng. Chem. 48, 2132 (1956), U.S. Pat. Specification No. 3,323,979, DT-OS (German Published Specification) No. 2,156,858, DT-OS (German Published Specification) No. 2,345,922, British Patent Specification No. 829,696, U.S. Pat. No. 2,591,573, Journ. Prakt. Chem. 159, 193 (1944), Journ. Prakt. Chem. 6, 289 (1958) and Journ. Org. Chem. 9, 125 (1944).

Examples which may be mentioned are: substances of the category of compounds comprising the vinyl homopolymers or copolymers having cationic groups, as well as polyethyleneimines and derivatives, including, on the other hand, homopolymeric and copolymeric vinyl compounds with anionic groups.

Vinyl polymers having a cationic group which may be mentioned are polyvinylpyridines and, in particular, polymeric derivatives of (meth-)acrylic acid or of styrene which contain amino groups or ammonium groups, such as polyaminomethylstyrenes or polyacrylic acid esters containing amino groups or ammonium groups, but preferably homopolymers or copolymers of derivatives of acrylic acid or methacrylic acid which contain quaternary ammonium groups, in particular polymers based on trialkyl-ammonium alkyl esters of acrylic acid or methacrylic acid, that is to say, in general, polymers which are to be regarded as homopolymers or copolymers of the type

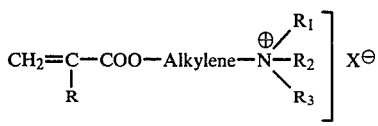

in which
R is H or $CH_3$ and
$R_1$, $R_2$ and $R_3$ independently of one another can be H or alkyl, especially $CH_3$, $C_2H_5$ or $C_3H_7$,
Alkylene represents an alkylene radical containing two to five carbon atoms and
$X^\ominus$ represents an anionic group, such as $Cl^\ominus$, $Br^\ominus$, $CH_3SO_4^\ominus$, $HSO_4^\ominus$ or $SO_4^{2\ominus}$.

Preferred homopolymers which can be used are the following compounds:

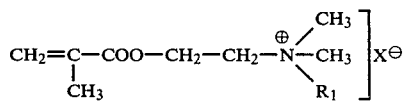

especially those in which
$R_1$ is $CH_3$ and
$X^\ominus$ has the abovementioned meaning.

The molecular weights of the cationic vinyl polymers described are between 20,000 and 300,000, preferably between 40,000 and 100,000.

Copolymers of acrylamide and dimethylaminoethyl methacrylate, such as are described in German Offenlegungsschrift (German Published Specification) No. 2,255,391, and also the Mannich bases which are obtainable therefrom by reaction with formaldehyde and dimethylamine can also be used advantageously, as can copolymers which additionally also contain acrylic acid. The molecular weights can be up to 20 million.

Examples of vinyl polymers having anionic groups which may be mentioned are: vinyl polymers having carboxyl groups and/or sulphonic acid groups, such as homopolymers or copolymers of (meth-)acrylic acid or of the styrenesulphonic acids.

Acrylic acid/acrylamide copolymers and methacrylic acid/methacrylamide copolymers and corresponding copolymers with further vinyl monomers are preferably used. The molecular weights of the anionic polymers and copolymers mentioned are about 300,000 to 12,000,000, preferably between 2,000,000 and 10,000,000.

The cationic and anionic polymers are used in a total amount, based on the amount of effluent from which the metal is to be removed, of 1 to 100 ppm ($\triangleq$ 1 to 100 g/m$^3$), but preferably of 10 to 50 ppm.

The ratio by weight of the cationic polymers to the anionic polymers in the mixtures of cationic and anionic polymers which are preferably employed is generally between 5:1 and 1:5, depending on the number of cationic and anionic groups per macromolecule, but is preferably in the range between 1:1 and 5:1.

The ratio by weight of polymer:metal sulphide can vary within wide limits. In general it is 1:2 to 1:200.

In order to achieve the full effect of the flocculating agents, the precipitation of the heavy metal sulphides must be effected in an acid range at pH<2, but preferably at a pH of less than 1. The concentrations of mineral acid can vary within a wide range between 0.1% and 50%.

The heavy metal contents of the acid aqueous systems in question, for example effluents from dyestuffs and their precursors, can vary between the limits of 5 and 10,000 ppm.

Depending on the medium and the hydrogen sulphide donor, the precipitation of the heavy metal sulphide can be carried out at 20° to 150° C., but preferably at 60° to 120° C.

By means of the process according to the invention it is possible, in a simple manner, to reduce the contents of heavy metals in aqueous systems, and in particular to reduce the mercury content in the case of a dyestuff synthesis based on the sulphonation of anthraquinone in the presence of mercury catalysts, to values of about 1 ppm and below.

EXAMPLE 1

A solution of 5.5 kg of sodium sulphide in the form of flakes ($Na_2S \cdot 3 H_2O$; 60% $Na_2S$) in 25 l of water is added, at 70° C., in the course of about 30 minutes, to 1,000 l of an aqueous, strongly acid mother liquor (pH<1), such as is obtained, for example, after the reaction of 1-amino-4-bromoanthraquinone-2-sulphonic acid (bromoamine acid) with 4-aminoacetanilide and, as a result of the use of a copper salt catalyst, has a copper ion content of 1,000 to 1,300 ppm. 2.5 kg of active charcoal are added in order to lighten the colour and the mixture is stirred for a further 1 hour. 0.5% strength aqueous solutions of two flocculating agent components of the following composition are now added successively, each in an amount of 0.5 l, at the above temperature:

(a) a copolymer of acrylamide and acrylic acid in a molar ratio of 2:1; molecular weight 5,000,000 to 10,000,000, and (b) a homopolymer of the compound of the formula

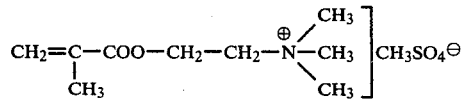

molecular weight 60,000 to 80,000.

The amount of each flocculating agent component which is added is 2.5 ppm, based on the amount of mother liquor. After stirring further for a short time, the mother liquor containing copper sulphide is clarified through a double layer of a normal filter paper, for example No. BF from Messrs. Schleicher and Schüll, or through a double layer of a firmly clamped polypropylene filter cloth (warp, 22 ends/cm, NM 28/2 and weft, 13 picks/cm, NM 28/2, weight 275 g/m$^2$), for example in a filter press.

The filtrate from the mother liquors treated in this way contains less than 1 ppm of copper.

An identical result is obtained if the precipitation of the copper sulphide and the addition of flocculating agent are carried out at 90° to 95° C.

EXAMPLE 2

15.7 l of an 18% strength technical grade sodium bisulphide solution (NaSH), d=1.25, are added in the course of 30 minutes, at 70° to 75° C., to 1,000 l of an aqueous, strongly acid mother liquor (1 to 5% strength hydrochloric acid), such as is obtained, with a content of heavy metals, in the dissolved form, of 2,000 to 2,500 ppm of copper and about 100 ppm of molybdenum, from the preparation of copper phthalocyanine. The mixture is stirred for about a further 1 hour and aqueous solutions of flocculating agent are then added successively, each in an amount of 0.5 l, at 70° to 75° C., the solutions each containing 0.5% of the components of the following composition, that is to say the amount of flocculating agent substance added in each case is 2.5 ppm, based on the amount of mother liquor:
(a) a copolymer of acrylamide and acrylic acid in a molar ratio of 2:1; molecular weight 5,000,000 to 10,000,000, and
(b) a homopolymer of the compound of the formula

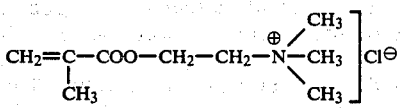

with a molecular weight of 60,000 to 80,000.

Pronounced agglomeration of the precipitate of the sulphides of the heavy metals is observed after addition of the flocculating agent components. After the suspension has been filtered through a double layer of normal filter paper, for example No. BF from Messrs. Schleicher and Schüll, the two filter papers being close together, the filtrate contains less than 1 ppm of copper and less than 2 ppm of molybdenum.

The filtration can also be carried out through a precoated rotary filter which is covered with a 50 mm thick layer of kieselguhr, instead of through a paper filter.

The same result is obtained if a solution of 9.2 kg of sodium sulphide ($Na_2S$ content 60%) and 2.1 kg of flowers of sulphur—that is to say a solution of sodium disulphide ($Na_2S_2$)—in 90 l of water is employed in place of the solution of technical grade sodium bisulphide for precipitation of the metal ions.

EXAMPLE 3

1 kg of active charcoal is added, at 70° C., to 1,000 l of an aqueous, strongly acid mother liquor having a hydrochloric acid content of 10 to 20% and a copper content of 4,000 to 5,000 ppm, such as is obtained, for example, in the case of products which have been prepared by introducing chlorine by means of a Sandmeyer reaction, and 32 l of an 18% strength solution of technical grade sodium bisulphide (d=1.25), or a solution of 16.6 kg of sodium sulphide (as flakes, $Na_2S$ content 60%) in 83 l of water is then added in the course of about 30 minutes. After stirring for a further one hour, a combination of flocculating agents is added, 0.5% strength solutions of each of the following flocculating agents being added successively, each in an amount of 0.5 l:
(a) a copolymer of acrylamide and acrylic acid in a molar ratio of 2:1; molecular weight 5,000,000 to 10,000,000, and
(b) a homopolymer of the compound of the formula

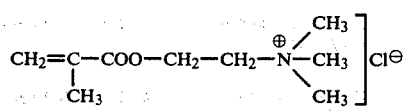

molecular weight 60,000 to 80,000.

A filtrate which has a copper content of less than 1 ppm is obtained by filtering the suspension, after stirring further for a short time, through a double layer of normal filter paper, for example No. BF from Messrs. Schleicher and Schüll, or of firmly clamped polypropylene filter cloth (see Example 1 for the characteristics) in a filter press.

EXAMPLE 4

5.9 l of an 18% strength solution of technical grade sodium bisulphide, or a solution of 3.1 kg of sodium sulphide (as flakes, $Na_2S \cdot 3 H_2O$) in 15 l of water, are allowed to run slowly, at 70° C., into 1,000 l of a strongly acid mother liquor which has a copper content of 900 to 1,000 ppm and is obtained during the processing of anthrimides (preparation by Ullmann condensation of α-halogenoanthraquinones and α-aminoanthraquinones). 2 kg of active charcoal are added and the mixture is stirred for a further 1 hour.

The copper sulphide which has precipitated is now bound by adding 2.5 l of a 0.1% strength solution of a flocculating agent, the latter being a copolymer, with a molecular weight of 5,000,000 to 10,000,000, of acrylic acid in a molar ratio of 2:1, and 2.5 l of a 0.5% strength solution of a flocculating agent, this being a polymer of trimethylammonium ethylmethacrylate chloride with a molecular weight of 60,000 to 80,000. After further stirring for a short time and filtering through a double layer of normal filter paper or through a double layer of firmly clamped polypropylene filter cloth (see Example 1 for the characteristics), for example in a filter press, a filtrate with a copper content of <1 is obtained.

EXAMPLE 5

4.2 kg of phosphorus pentasulphide ($P_2S_5$) are introduced, at 80° to 90° C., into 1,000 l of an aqueous, strongly acid mother liquor, which is obtained from the preparation of copper phthalocyanine and has a heavy metal content of 2,000 ppm of copper and 100 ppm of molybdenum. The mixture is stirred for a further 1 to 2 hours in order to complete the hydrolysis of phosphorus pentasulphide and the precipitation of the heavy metal sulphide and 2 l of a 0.1% strength solution of a flocculating agent consisting of a copolymer, with a molecular weight of 5,000,000 to 10,000,000, of acrylamide and acrylic acid in a molar ratio of 6:4, - that is to say 2 ppm, based on the mother liquor, of flocculating agent - and 2 l of a 0.5% strength solution, that is to say 10 ppm, of a flocculating agent which is to be regarded as a polymer of trimethyl-ammonium methacrylate bisulphate with a molecular weight of 60,000 to 80,000, are then added. If, after stirring further for a short time, the mixture containing the heavy metal sulphide, which has been agglomerated with the aid of the flocculating agent, is filtered off, after adding 2 kg of active charcoal or celite, through a double layer of normal filter paper, which forms a tight seal, or through a double layer of a firmly clamped polypropylene filter cloth (see Example 1 for the characteristics), a filtrate which has a heavy metal content of less than 1 ppm of copper and less than 2 ppm of molybdenum is obtained.

EXAMPLE 6

5.9 l of a technical grade 18.5% strength solution of sodium bisulphide (d=1.25) and 2 kg of active charcoal are added slowly, at 70° to 80° C., to 1,000 l of a strongly acid, aqueous mother liquor, such as is obtained, with a metal content of 900–2,000 ppm of copper, after the reaction of 1-amino-4-bromo-anthraquinone-2-sulphonic acid with N-(4-aminobenzyl)-N,N-dimethylamine. After stirring for a further hour, 2.5 l of a 0.1% strength aqueous solution of a copolymer, with a molecular weight of 5,000,000 to 10,000,000, of acrylamide and acrylic acid in a molar ratio of 3:5 and 0.5 l of a 0.1% strength aqueous solution of a homopolymer, with a molecular weight of 70,000 to 100,000, of the compound of the formula

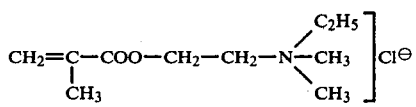

are added.

If, after stirring further for a short time, the agglomerates of copper sulphide are filtered off through a double paper filter, for example No. BF from Messrs. Schleicher and Schull, or through a tightly clamped Dralon filter cloth, which is covered with a 2 mm thick layer of active charcoal, the filtrate has a copper content of less than 1 ppm.

EXAMPLE 7

2 kg of active charcoal are added to 1,000 l of a strongly acid, aqueous mother liquor, such as is obtained, for example, with a copper content of 200 to 300 ppm, after reacting 1-amino-4-bromoanthraquinone-2-sulphonic acid with 2,6-diamino-toluene-5-sulphonic acid, in order to lighten the colour. 2.5 kg of sodium sulphide (as flakes, 60% of Na₂S) in 12.5 l of water, or 4.7 l of an 18% strength solution of technical grade sodium bisulphide (d=1.25), are added in the course of about 30 minutes at 70° to 80° C. 1 l of a 0.2% strength aqueous solution of a flocculating agent, which is a copolymer, with a molecular weight of 5,000,000 to 10,000,000, of acrylamide and acrylic acid in a molar ratio of 2:1, and 0.5 l of a 0.5% strength aqueous solution of a flocculating agent which can be described as a polymer, with a molecular weight of 40,000 to 60,000, of the following compound

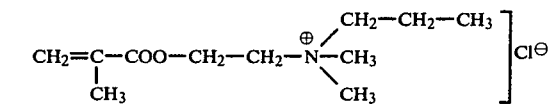

are now introduced successively.

After filtering off the agglomerates of copper sulphide in one of the ways described in the preceding examples, the filtrate contains less than 1 ppm of copper.

EXAMPLE 8

2.1 kg of sodium sulphide (Na₂S . 3 H₂O), dissolved in 10 l of water, are added, at 70° to 75° C., to 1,000 l of an aqueous, strongly acid mother liquor, such as is obtained, for example, with a copper content of 500 ppm, after reacting 1-amino-4-bromo-anthraquinone-2-sulphonic acid with p-anisidine. 2 kg of active charcoal are also added in order to decolorise the dyestuff liquor and the mixture is stirred for a further 1 hour at 70° C. 2.5 l of a 0.1% strength aqueous solution of a flocculating agent which is a copolymer, with a molecular weight of 5,000,000 to 10,000,000, of acrylamide and acrylic acid in a molar ratio of 2:1, and 0.5 l of a 0.5% strength aqueous solution of a homopolymer, with a molecular weight of 40,000 to 60,000, of the compound of the formula

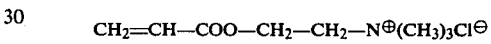

are now added to the copper sulphide suspension before the latter is filtered.

Filtration of the flocculated copper sulphide through filter layers described in the preceding examples gives a filtrate with a copper content of less than 1 ppm.

EXAMPLES 9 TO 14

Filtrates having the same copper content (<1 ppm) are obtained when, in Example 1, in place of the combination, mentioned in that example, of flocculating agents consisting of cationic and anionic components, the combinations mentioned in Table 1 are employed; the amounts of flocculating agent component given in ppm are to be related to the amount of mother liquor containing the heavy metal.

Table 1

| Example No. | ppm | Cationic components Polymer of | Molecular weight | ppm | Anionic components Copolymer of | Molar ratio | Molecular weight |
|---|---|---|---|---|---|---|---|
| 9 | 12.5 | $CH_2=\underset{CH_3}{\underset{|}{C}}-COO-CH_2-CH_2-\overset{\oplus}{N}(CH_3)_3 \quad HSO_4^{\ominus}$ | 60–80,000 | 2.5 | Acrylamide and acrylic acid | 2 : 1 | 5–10 million |
| 10 | 5.0 | $CH_2=\underset{CH_3}{\underset{|}{C}}-COO-CH_2-CH_2-\overset{\oplus}{N}(CH_3)_3 \; Cl^{\ominus}$ | 60–80,000 | 2.5 | Acrylamide and acrylic acid | 3 : 5 | 5–10 million |
| 11 | 4.0 | $CH_2=\underset{CH_3}{\underset{|}{C}}-COO-CH_2-CH_2-N(CH_3)_2 \cdot HCl$ | 60–80,000 | 4 | Acrylamide and acrylic acid | 1 : 1 | 10–12 million |
| 12 | 7.0 | $CH_2=\underset{CH_3}{\underset{|}{C}}-COO-CH_2-CH_2-N(C_2H_5)_3 \; Cl^{\ominus}$ | 80–100,000 | 3.5 | Acrylamide and acrylic acid | 3 : 1 | 5–10 million |
| 13 | 10.0 | $CH_2=CH-COO-CH_2-CH_2-\overset{\oplus}{N}(CH_3)_3 \; Cl^{\ominus}$ | 40–60,000 | 2.5 | Acrylamide and acrylic acid | 2 : 1 | 5–10 million |

Table 1-continued

| Example No. | ppm | Cationic components Polymer of | Molecular weight | ppm | Anionic components Copolymer of | Molar ratio | Molecular weight |
|---|---|---|---|---|---|---|---|
| 14 | 10.0 | $CH_2-\underset{\underset{CH_3}{\mid}}{C}-COO-CH_2-CH_2-\overset{\oplus}{N}(CH_3)_3\ Cl^{\ominus}$ | 60-80,000 | 10.0 | Acrylamide and acrylic acid | 3 : 5 | 1-3 million |

EXAMPLE 15

An aqueous solution of anthraquinone-1-sulphonic acid which contains about 10% of anthraquinone-1-sulphonic acid and 20% of sulphuric acid as well as about 100 ppm of Hg in the form of HgS is treated with, per $m^3$, 0.2 kg of kieselguhr (for example Celite 535 from Messrs. Johns-Manville).

Initially, a 0.1% strength aqueous solution of a copolymer, with a molecular weight of 5 to 10 million, consisting of 70% of acrylamide and 30% of acrylic acid is admixed continuously, at a temperature of 80° to 90° C., in an amount of 20 l per $m^3$ of suspension, to the stream of suspension flowing towards the rotary filter; a few seconds later a 0.1% strength aqueous solution of a polymeric methacrylic acid trimethylammonium ethyl ester-chloride or ester-sulphate with a molecular weight of 40,000 to 60,000 is continuously admixed, also in an amount of 20 l per $m^3$ of suspension. The hot suspension thus obtained is filtered continuously through a rotary filter which has a 20 to 80 mm thick precoat layer of kieselguhr (for example Celite 535); the filtrate contains 1 ppm or less of Hg. The layer of Celite and HgS which is deposited on the filter is washed, on the filter, with water, preferably warm water, until almost acid-free and is continuously removed with a scraper. The mixture scraped off is passed to a mercury recovery unit.

The rate of filtration is about 1.5 $m^3/m^2$ per hour.

EXAMPLE 16

A solution of thiolic acid (anthraquinone-1,5-disulphonic acid) which contains about 20% of thiolic acid and 3 to 4% of sulphuric acid as well as 2,000 to 2,500 ppm of Hg in the form of HgS is treated with, per $m^3$, about 4 kg of kieselguhr (for example Celite 545 from Messrs. Johns-Manville).

Initially, a 0.1% strength aqueous solution of a copolymer, with a molecular weight of 5 to 10 million, consisting of 70% of acrylamide and 30% of acrylic acid is admixed continuously, at a temperature of 70° to 80° C., in an amount of about 20 l per $m^3$ of suspension, to the stream of suspension flowing towards the rotary filter; about 20 seconds later, a 0.1% strength aqueous solution of a polymeric methacrylic acid trimethyl-ammonium ethyl ester-chloride or ester-sulphate with a molecular weight of 40,000 to 60,000 is additionally continuously admixed, in an amount of 20 l per $m^3$ of suspension. The suspension thus obtained is filtered continuously through a rotary filter which has a 20 to 80 mm thick precoat layer of kieselguhr; the filtrate contains 0.06 to 0.24 ppm of Hg. The layer deposited on the filter is washed, on the filter, with water, preferably warm water, until almost acid-free and is continuously removed with a scraper. The mixture of kieselguhr and HgS thus obtained is passed to a mercury recovery unit.

The rate of filtration is about 1 $m^3/m^2$ per hour.

EXAMPLE 17

A solution of azine acid (anthraquinone-1,8-disulphonic acid) which contains about 6% of azine acid and 8% of other anthraquinone disulphonic acids as well as 30 to 40% of sulphuric acid and about 1,500 to 2,000 ppm of Hg in the form of HgS is treated with, per $m^3$, 3 to 4 kg of kieselguhr (for example Celite 535 from Messrs. Johns-Manville).

Initially, a 0.1% strength aqueous solution of a copolymer, with a molecular weight of 5 to 10 million, consisting of 70% of acrylamide and 30% of acrylic acid is continuously admixed, in an amount of 20 l (per $m^3$ of suspension), to the stream of suspension flowing towards the rotary filter; about 20 seconds later, a 0.1% strength aqueous solution of a polymeric methacrylic acid trimethyl-ammonium ethyl ester-chloride or ester-sulphate with a molecular weight of 40,000 to 60,000 is additionally added continuously, in an amount of 20 l (per $m^3$ of suspension). The suspension thus obtained is filtered, as described in Example 15 and 16. The filtrate still contains 0.2 to 0.8 ppm of Hg.

The rate of filtration is about 1.2 $m^3/m^2$ per hour.

EXAMPLES 18 TO 56

A solution of azine acid having the same composition as in Example 17 was treated as described in Example 17 using various combinations of polymers and using various filter aids.

The substances used and the results obtained are shown in the Table which follows.

The abbreviations are explained after the Table.

It was found to be appropriate first to add the anionic polymer to the solution and then to add the cationic polymer to the solution. See Table 3 for the composition of the polymers.

Table 2

| Example No. | Polymers | | | | Hg content of the filtered solution (ppm) |
|---|---|---|---|---|---|
| | Anionic | | Cationic | | |
| | Type | Amount (g/m³) | Type | Amount (g/m³) | |
| 18 | I | 20 | III | 20 | 0.8 |
| 19 | I | 20 | IV | 20 | 0.9 |
| 20 | I | 20 | V | 20 | 0.5 |
| 21 | VII | 60 | II | 60 | 1.5 |
| 22 | VI | 40 | II | 40 | 1.5 |
| 23 | I | 40 | XIII | 40 | 1.1 |
| 24 | I | 40 | XIV | 40 | 1.0 |
| 25 | I | 40 | VIII | 40 | 0.8 |
| 26 | I | 40 | XXII | 40 | 0.5 |
| 27 | I | 40 | XXIII | 40 | 0.5 |
| 28 | XI | 20 | II | 20 | 0.7 |
| 29 | IX | 20 | II | 20 | 0.7 |
| 30 | X | 20 | II | 20 | 1.2 |
| 31 | XV | 20 | II | 20 | 0.8 |
| 32 | XII | 20 | II | 20 | 0.6 |
| 33 | XVIII | 20 | II | 20 | 0.8 |
| 34 | XIX | 20 | II | 20 | 1.1 |
| 35 | XX | 20 | II | 20 | 0.5 |
| 36 | XXI | 20 | II | 20 | 0.5 |

Table 2-continued

| | Polymers | | | Hg content of the filtered solution (ppm) |
|---|---|---|---|---|
| | Anionic | | Cationic | |
| Example No. | Type | Amount (g/m³) | Type | Amount (g/m³) | |

| Example No. | Type | Amount (g/m³) | Type | Amount (g/m³) | Hg content (ppm) |
|---|---|---|---|---|---|
| 37 | IX | 20 | XXII | 20 | 0.7 |
| 38 | XII | 20 | XXII | 20 | 0.5 |
| 39 | IX | 20 | XXIII | 20 | 1.0 |
| 40 | XII | 20 | XXIII | 20 | 0.9 |
| 41 | XX | 20 | XXIII | 20 | 0.8 |
| 42 | XVII | 20 | II | 20 | 1.5 |
| 43 | I | 20 | XVI | 20 | 0.9 |
| 44 | XX | 20 | XXII | 20 | 0.8 |
| 45 | XXI | 20 | XXII | 20 | 0.8 |
| 46 | XVIII | 20 | XXII | 20 | 0.8 |
| 47 | XIX | 20 | XXII | 20 | 0.6 |
| 48 | X | 20 | XXII | 20 | 0.5 |
| 49 | XI | 20 | XXII | 20 | 0.4 |
| 50 | XV | 20 | XXII | 20 | 0.4 |
| 51 | XX | 20 | XXIII | 20 | 0.5 |
| 52 | XXI | 20 | XXIII | 20 | 0.7 |
| 53 | XVIII | 20 | XXIII | 20 | 0.6 |
| 54 | X | 20 | XXIII | 20 | 1.2 |
| 55 | XI | 20 | XXIII | 20 | 0.9 |
| 56 | XV | 20 | XXIII | 20 | 0.8 |

Table 3

Composition of the polymers

| No. | Composition | Molecular weight |
|---|---|---|
| I | Acrylamide/acrylic acid, 70:30 | 5-10 million |
| II | Trimethyl-ammonium ethyl methacrylate chloride | 50,000 |
| III | Trimethyl-ammonium ethyl acrylate chloride | 50,000 |
| IV | Trimethyl-ammonium ethyl methacrylate-chloride | 2 million |
| V | 4-Trimethyl-ammonium-methylstyrene sulphate | >10 million |
| VI | Polystyrenesulphonic acid | 20,000 |
| VII | Polystyrenesulphonic acid | 800,000 |
| VIII | Polyethyleneimine | 20,000 |
| IX | Acrylamide | about 5 million |
| X | Acrylic acid | about 5 million |
| XI | Acrylamide/acrylic acid, 50:50 | about 5 million |
| XII | Acrylic acid/dimethylaminoethyl methyacrylate, 50:50 | about 1 million |
| XIII | Dimethylaminoethyl methacrylate | about 2 million |
| XIV | Acrylamide/dimethylaminoethyl methacrylate, 50:50 | about 2 million |
| XV | Acrylamide/dimethylaminoethyl methacrylate, 90:10 | about 1 million |
| XVI | Condensation product of dicyandiamide/formaldehyde/ammonium sulphate | ? |
| XVII | Methacrylic acid/butyl acrylate, 40:60 | 0.5-1 million |
| XVIII | Acrylamide/acrylic acid, 72:28 | 1-5 million |
| XIX | Acrylamide/acrylic acid, 88:12 | 1-5 million |
| XX | Acrylamide/methacrylic acid, 88:12 | 1-5 million |
| XXI | Acrylamide/methacrylic acid, 96:4 | 1-5 million |
| XXII | Acrylamide/dimethylaminoethyl methacrylate, 80:20 | 10-15 million |
| XXIII | Mannich base obtained from acrylamide/dimethylaminoethyl methacrylate, 80:20 and dimethylamine and formaldehyde | 15-20 million |

We claim:

1. A process for substantially removing HgS from hot and strongly acid dyestuff or dyestuffs precursor waste effluents consisting essentially of sequentially adding firstly an anionic polymer comprising an acrylic acid/acrylamide or methacrylic acid/acrylamide copolymer and secondly a cationic polymer comprising a homopolymer or copolymer of a compound of the formula

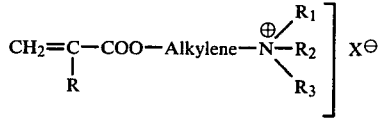

in which

R is H or $CH_3$;

$R_1$, $R_2$ and $R_3$ independently of one another are H, $CH_3$, $C_2H_5$ or $C_3H_7$;

Alkylene is an alkylene radical containing 2 to 5 carbon atoms; and $X^\ominus$ is an anion in amounts of from 1 to 100 ppm of cationic and anionic polymer based on the amount of effluent or dyestuff precursor to a dilute aqueous dyestuff waste effluent containing from 5 to 10,000 ppm of mercury sulfide in acid aqueous suspension, the ratio of cationic polymer to anionic polymer ranging from 5:1 to 1:5 by weight, said effluent having a pH of less than 2 and a temperature of from 60° C. to about 120° C., to agglomerate the mercury sulfide into stable, coarse flocs, and then removing said flocs from the effluent by filtration.

2. The process of claim 1, wherein the pH of the effluent is less than 1.

3. A process for substantially removing mercury from a hot, strongly acid, waste effluent from the synthesis of dyestuffs and the synthesis of dyestuff precursors consisting essentially of (a) precipitating mercury sulfide from a dyestuff or dyestuff precursor waste effluent having a pH of less than 2, a mineral acid concentration of up to 50% and a mercury content of from 5 to 10,000 ppm, at a temperature from 60° C. to 120° C. by introducing therein a sulfide donor to form a dilute, acid, aqueous suspension of mercury sulfide;

(b) agglomerating said suspended mercury sulfide by the sequential addition of firstly an anionic polymer comprising an acrylic acid/acrylamide or methacrylic acid/methacrylamide copolymer and secondly a cationic polymer comprising a homopolymer or copolymer of a compound of the formula

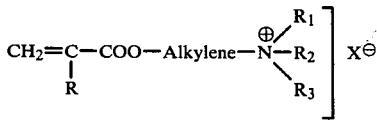

in which

R is H or $CH_3$;

$R_1$, $R_2$ and $R_3$ independently of one another are H, $CH_3$, $C_2H_5$ or $C_3H_7$;

Alkylene is an alkylene radical containing 2 to 5 carbon atoms; and $X^\ominus$ is an anion in amounts of from 1 to 100 ppm of cationic and anionic polymer based on the amount of effluent to said acid aqueous suspension at a temperature from 60° C. to 120° C. to form coarse, stable flocs of mercury sulfide, the ratio of cationic polymer to anionic polymer ranging from 5:1 to 1:5 by weight;

(c) removing said agglomerated mercury sulfide from said effluent by filtration to provide a clarified filtrate with a residual mercury content of less than 1 ppm.

4. The process of claim 3, wherein the sulfide is agglomerated at temperatures between 70° C. and 100° C.

5. The process of claim 3, wherein said synthesis of a dyestuff precursor comprises the sulfonation of anthraquinone in the presence of mercury catalysts and said effluent contains mercury in amounts from 5 to 10,000 ppm, 6. Process of claim 3, wherein the cationic polymer is a homopolymer of a compound of the formula

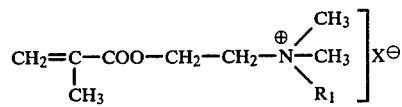

7. Process of claim 6, wherein $R_1$ is $CH_3$.

8. Process of claim 3, wherein the cationic polymer is a copolymer of acrylamide and dimethylaminoethylmethacrylate.

* * * * *